April 10, 1928.

H. S. HOLMES 1,665,461

WELDING TUBES TO PLATES OR CYLINDERS

Filed March 27, 1926   2 Sheets-Sheet 1

Inventor
HENRY S. HOLMES.
By His Attorney

April 10, 1928.
H. S. HOLMES
1,665,461
WELDING TUBES TO PLATES OR CYLINDERS
Filed March 27, 1926    2 Sheets-Sheet 2
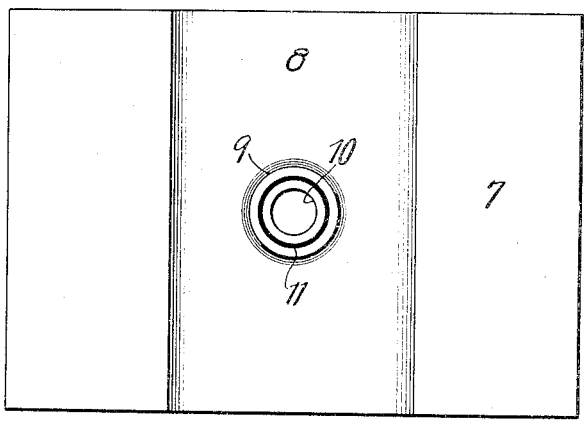
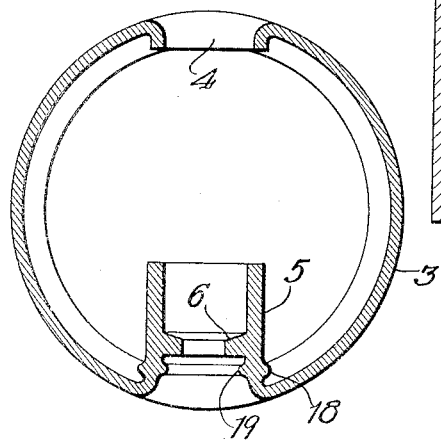
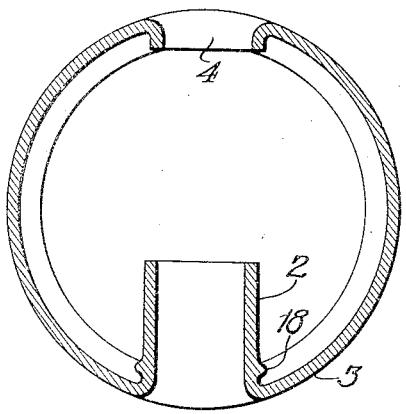
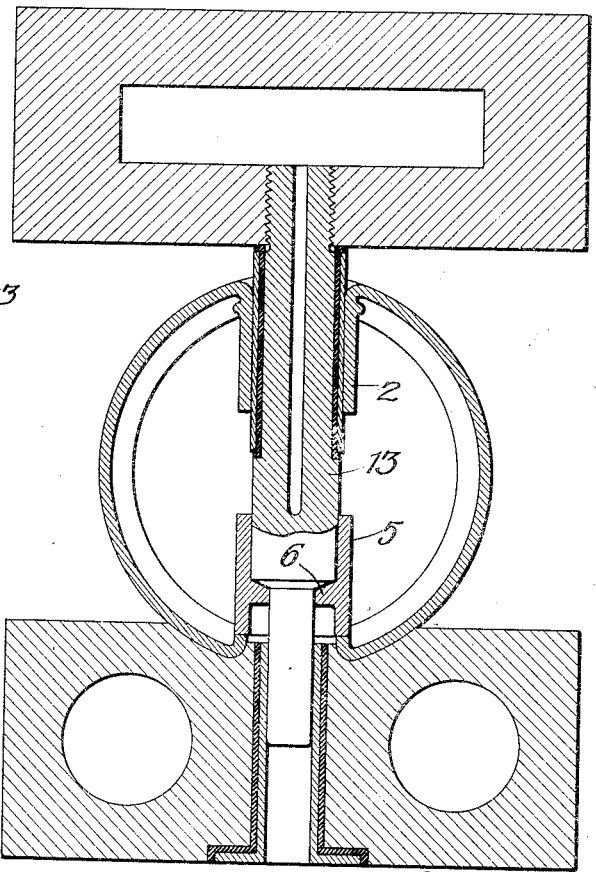
Inventor
HENRY S. HOLMES.
By His Attorney Patented Apr. 10, 1928.

1,665,461

UNITED STATES PATENT OFFICE.

HENRY S. HOLMES, OF NEW YORK, N. Y., ASSIGNOR TO THOMAS E. MURRAY, OF BROOKLYN, NEW YORK.

WELDING TUBES TO PLATES OR CYLINDERS.

Application filed March 27, 1926. Serial No. 97,867.

My invention provides improvements in methods and apparatus by which a pipe can be welded at its end to a plate or cylinder and particularly where the parts are so shaped as to make access in the ordinary way difficult. The invention is shown in the welding of pin bushings to the sides of a hollow piston.

Fig. 5 is a plan of the lower electrode;

Figs. 6 and 7 are cross-sections of the work in successive stages;

Fig. 8 is a cross-section of the parts in position for welding the second bushing.

Figure 2:
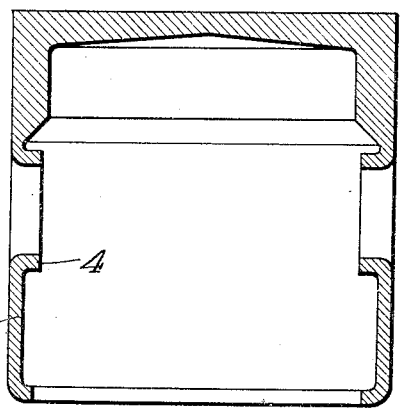
Fig. 2 is a similar section of the rough piston ready for application of the bushings.
Figure 3:
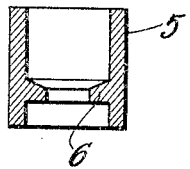
Fig. 3 is a similar section of a bushing.

In the embodiment of the invention illustrated a piston 1 is to be provided with inwardly projecting bushings 2 for the pins of the connecting rod. The first step is to make a rough piston 3, Fig. 2, by forging or hot pressing or drawing from a steel billet or blank; with holes pierced at opposite ends of a diameter and drawn in to form ribs 4. The bushings also may be forged or hot pressed, or cast or they may be turned from a solid rod or tube to the shape shown in Fig. 3, comprising a tube with an inside projection or shoulder 6 near the end which is to be welded.

Figure 4:
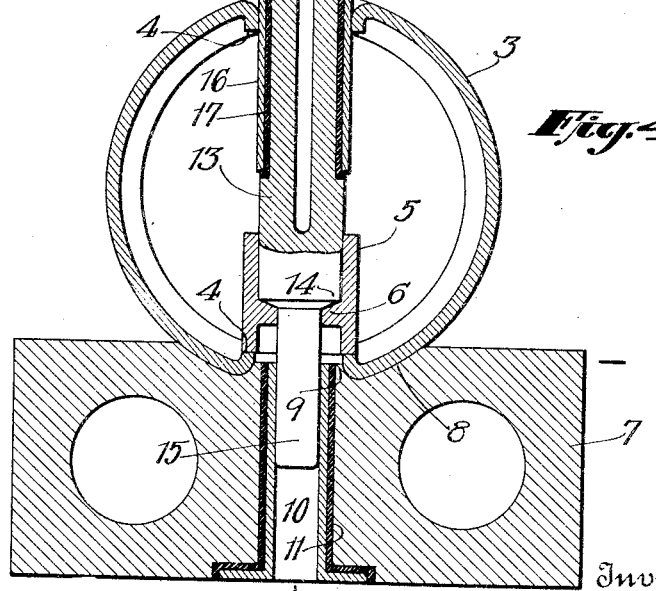
Fig. 4 is a cross-section of the parts in position for welding the first bushing.

Fig. 4 illustrates the rough piston 3 with a rough bushing 5 in postion to be welded to the rib 4 surrounding one of the openings. The piston rests on a lower electrode 7, fitting into a cylindrical groove 8, Fig. 5, on the upper face thereof. The electrode has a circular projection 9 which enters the hole in the side of the piston and locates the latter in correct position. There is an opening through the center of the projection 9, clear through the electrode, with a lining 10 separated by insulation 11 from the surrounding electrode.

The upper electrode 12 has a cylindrical projection 13 from its under side with a shoulder 14 adapted to bear on the shoulder 6 of the bushing, and with a guiding extension 15 which enters the guide tube 10 in the lower electrode. The upper part of the extension 15 has a guiding sleeve 16 around it and separated from it by insulation 17. The fit of the tube 16 in the upper flange 4 and of the extension 15 in the tube 10 hold the parts accurately in alignment.

Pressure is applied to the upper electrode 12, forcing the bushing 5 against the lower flange 4; and a current is passed from one electrode to the other through the joint. The metal is softened and welded and taken up by the continued pressure of the electrodes to the desired extent.

Fig. 6 shows the resulting shape of the joint with a certain quantity of metal extruded at each side in the form of an irregular rib or "flash" 18, 19. The inside flash 19 and the projection 6 are then removed with a drill or reamer, reducing the bushing to the finished form 2 of Figs. 7 and 1.

The piston is then turned upside down, Fig. 8, and the second bushing 5 applied in the same way as the first one. The upper bushing 2 forms a long guide for the part 13 of the upper electrode and ensures perfect alignment of the two bushings.

Figure 1:
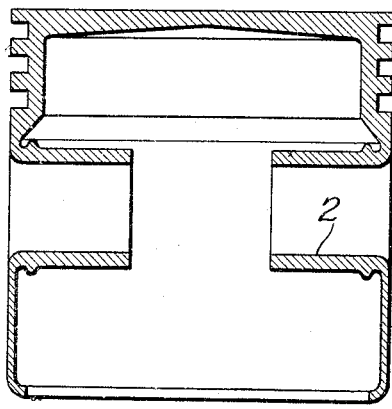
Fig. 1 is a horizontal section of the finished piston.

The second bushing is finished in the same way as the first and the piston machined to the finished shape shown at 1, Fig. 1. The electrodes may be of copper, with openings as shown for water cooling. The guide tubes 10 and 16 may be of brass or steel, preferably the tube 10 being brass and the tube 16 steel.

In the restricted space permitted it would be very difficult to apply the bushings by ordinary electrodes surrounding them. It is important that the electrode engage the bushing near the outer end so as to provide a short path for the current through the metal of the bushing to the joint. And while the invention is of particular value in welding bushings on the inside of the hollow piston, it has advantages also in welding pipes to plates of other shapes than the cylindrical one described.

Various modifications of the described method and apparatus, and applications of them to the production of various other products, may be made by those skilled in the art without departure from the invention as defined in the following claims.

What I claim is:

1. In a welding of a pipe to a plate, the method which consists in providing a projection on the inside of the pipe and pressing it against the plate by pressure applied to said projection.

2. In the welding of a pipe to a plate, the method which consists in providing a projection on the inside of the pipe and pressing it against the plate by pressure applied to said projection and subsequently removing said projection.

3. In the welding of a pipe to the inside of a cylinder the method which consists in providing a projection on the inside of the pipe and pressing the latter against the cylinder by pressure applied to said projection.

4. In the welding of a pipe to the inside of a cylinder the method which consists in passing a tool through an opening in the other side of the cylinder and into engagement with the pipe and exerting pressure on said tool to force the pipe against the cylinder.

5. The method of claim 4, the pipe having a projection on the inside, against which the tube bears.

6. In the welding of pin bushings to a piston the method which consists in forming opposite openings in the piston and introducing a tool through one opening to engage a bushing and press it against the piston around the other opening.

7. The method of claim 6, the bushings being provided with a projection on the inside against which the tool bears.

8. The method of claim 6, the piston being provided with flanges around the openings and the bushings being welded to these flanges.

9. The method of claim 6 the pressing tool constituting one electrode and the piston being supported against a second electrode, and a current being passed between the electrodes to heat the joint being welded.

10. An apparatus of the class described including a pair of electrodes one of which is adapted to pass through an opening in the work and is provided with an insulated sleeve for guiding it in such opening.

11. An apparatus of the class described including a pair of electrodes of which one is provided with an opening and the other with an extension passing through the work and entering and guided in the opening in the first electrode.

12. An apparatus of the class described including a pair of electrodes one of which is adapted to pass through an opening in the work and is provided with an insulated sleeve for guiding it in such opening and which has an extension passing through the work and into the other electrode, the second electrode having an opening with an insulated lining, in which said extension is guided.

13. In the welding of a pipe to a plate, the method which consists in providing a projection on the inside of the pipe near the end to be welded and pressing the pipe against the plate by pressure of an electrode applied to said projection.

In witness whereof, I have hereunto signed my name.

HENRY S. HOLMES.